US008538627B2

(12) United States Patent
Asahara et al.

(10) Patent No.: US 8,538,627 B2
(45) Date of Patent: Sep. 17, 2013

(54) VEHICULAR COMMUNICATION SYSTEM, VEHICULAR INFORMATION COLLECTING SYSTEM, AND VEHICULAR COMMUNICATION PROGRAM

(75) Inventors: Nobuaki Asahara, Wako (JP); Ryoji Igarashi, Wako (JP); Hidehiko Anzai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 773 days.

(21) Appl. No.: 12/614,915

(22) Filed: Nov. 9, 2009

(65) Prior Publication Data

US 2010/0145570 A1 Jun. 10, 2010

(30) Foreign Application Priority Data

Dec. 9, 2008 (JP) ................................ 2008-313034

(51) Int. Cl.

| | |
|---|---|
| ***G06F 17/00*** | (2006.01) |
| ***G06F 19/00*** | (2011.01) |
| ***G08G 1/09*** | (2006.01) |
| ***G01C 21/00*** | (2006.01) |
| ***G01C 21/26*** | (2006.01) |

(52) U.S. Cl.
USPC .......... 701/36; 701/29.3; 701/29.6; 701/31.5; 340/901; 340/995.13

(58) Field of Classification Search
USPC .................. 701/36, 29.1, 117, 118, 119, 400, 701/408, 409, 1, 29.3, 29.6, 31.4, 31.5, 31.7, 701/32.1, 32.3, 32.6, 34.2; 340/901, 905, 340/933, 934, 995.1, 995.12, 995.13
See application file for complete search history.

(56) References Cited

U.S. PATENT DOCUMENTS

2005/0137781 A1 * 6/2005 Hudson ......................... 701/117

FOREIGN PATENT DOCUMENTS

| | | | |
|---|---|---|---|
| JP | 10-124797 | A | 5/1998 |
| JP | 10-340393 | A | 12/1998 |
| JP | 2005-006064 | A | 2/2005 |
| JP | 2005-266926 | A | 9/2005 |
| JP | 2006-048501 | A | 2/2006 |
| JP | 2006-221537 | A | 8/2006 |

* cited by examiner

*Primary Examiner* — Thomas Tarcza
*Assistant Examiner* — Edward Pipala
(74) *Attorney, Agent, or Firm* — Arent Fox LLP

(57) ABSTRACT

According to a vehicular communication system (10) of the present invention, a probe information can be sent to a server (20) from a second vehicle (Q2) out of an arbitrary number of second vehicles (Q2) whose present position is located in a designated area whose information is included in a multicast received by the second vehicle (Q2), in other words, a designated area with high necessity from the viewpoint of leading smoothly a first vehicle (Q1) to a desired position (P2). Also, the probe information can be collected in real time from the second vehicle (Q2) which was present in the designated area in the past and is beyond the designated area at the present time in consideration of the high capability that it holds useful information in estimating the present state thereof in the designated area.

9 Claims, 5 Drawing Sheets

FIG.4 (a)

| |
|---|
| TYPE OF TRANSMITTING CONDITION : 0 (=RECTANGULAR AREA) |
| BOTTOM LEFT CORNER: (LATITUDE=○○, LONGITUDE=●●) |
| TOP RIGHT CORNER: (LATITUDE=△△, LONGITUDE=▲▲) |
| TRANSMITTING END TIME : AFTER X MINUTES |
| TRANSMITTING FREQUENCY : Y TIMES PER MINUTE (OR PER METER) |

FIG.4 (b)

| | |
|---|---|
| TYPE OF TRANSMITTING CONDITION : 1 (=LINK ID) | |
| DESIGNATED LINKS : N | |
| LINK ID : ··· | N |
| ⋮ | |
| LINK ID : ··· | |
| TRANSMITTING END TIME : AFTER X MINUTES | |
| TRANSMITTING FREQUENCY : Y TIMES PER MINUTE (OR PER METER) | |

FIG.4 (c)

| |
|---|
| TYPE OF TRANSMITTING CONDITION : 2 (=RECTANGULAR AREA+VIN) |
| BOTTOM LEFT CORNER : (LATITUDE=○○, LONGITUDE=●●) |
| TOP RIGHT CORNER : (LATITUDE=△△, LONGITUDE=▲▲) |
| VIN : THE NTH DIGIT OF THE VIN IS "6" |
| TRANSMITTING END TIME : AFTER X MINUTES |
| TRANSMITTING FREQUENCY: Y TIMES PER MINUTE (OR PER METER) |

VEHICULAR COMMUNICATION SYSTEM, VEHICULAR INFORMATION COLLECTING SYSTEM, AND VEHICULAR COMMUNICATION PROGRAM

CROSS-REFERENCE TO RELATED APPLICATION

This application claims the priority of Japanese Application No. 2008-313034, filed Dec. 9, 2008, the entire specification, claims and drawings of which are incorporated herewith by reference.

BACKGROUND OF THE INVENTION

1. Field of the Invention

The present invention relates to a vehicular communication system mounted in a vehicle and the like.

2. Description of the Related Art

There has been disclosed an art configured to collect information related to a designated area from a vehicle. There has also been disclosed an art which makes a vehicle recognize an area where the vehicle is located and transmits to the vehicle the information related to the area at a predefined frequency (refer to Japanese Patent Laid-open No. H10-124797).

Further, there has been disclosed an art which determines a vehicle scheduled to pass through an information collecting area and transmits an information collecting command to the vehicle (refer to Japanese Patent Laid-open No. 2006-221537).

Furthermore, there has been disclosed an art which specifies a vehicle in an information collecting zone and collects a probe information from the vehicle (refer to Japanese Patent Laid-open No. 2005-266926).

However, none of the above-mentioned arts can collect information related to a designated area from an appropriate vehicle when the information is immediately needed.

SUMMARY OF THE INVENTION

The present invention has been accomplished in view of the aforementioned problems, and it is therefore an object of the present invention to provide a vehicular communication system and the like capable of collecting information related to a designated area from an appropriate vehicle in real time.

To accomplish an object described above, there is provided in the present invention a vehicular communication system mounted in a vehicle comprising: a vehicular receiving element configured to receive a multicast tagged with information of a designated area; a communication controlling element configured to collect information denoting a state of the vehicle as a probe information from an output signal of a sensor mounted in the vehicle; a vehicular transmitting element configured to transmit the probe information collected by the communication controlling element to a server; and a position determining element configured to determine a present position of the vehicle, wherein the communication controlling element is configured to transmit the probe information to the vehicular transmitting element on condition that the present position of the vehicle determined by the position determining element is located in the designated area.

According to the vehicular communication system of the present invention, the probe information is sent to the server from a vehicle among an arbitrary number of vehicles whose present position is located in the designated area whose information is included in a multicast received by the vehicle.

According thereto, the information related to the designated area can be collected in real time from an appropriate vehicle as the probe information.

It is acceptable that the communication controlling element is configured to collect information denoting a part of or the entire part of a link where the vehicle traveled and a movement cost thereof, an activity log of an environment accommodation device operated in compliance with an ambient weather or temperature of the vehicle, and an activity log of a steering device or a braking device mounted in the vehicle as the probe information.

According to the vehicular communication system of the mentioned configuration, the information denoting the travel log or the like of the vehicle in the designated area can be collected in real time from an appropriate vehicle as the probe information. The movement cost denotes time, energy (consumed fuel amount or the like) or fees (road toll or the like) needed by the vehicle to travel or move through a link. The ambient weather (whether it is raining or snowing) or temperature of the vehicle can be deduced from the activity log of the environment accommodation device. On the basis of the activity log of the steering device or the braking device, a black spot where attention is needed to be paid on driving can be estimated.

It is acceptable that the vehicular receiving element is configured to receive the multicast tagged with information of a designated cycle or a designated distance, and the communication controlling element is configured to transmit the probe information to the vehicular transmitting element every designated cycle or every designated distance traveled by the vehicle.

According to the vehicular communication system of the mentioned configuration, the information related to the travel log or the like of the vehicle in the designated area can be collected in real time from an appropriate vehicle as the probe information and at an appropriate frequency denoted by the designated cycle or the designated distance.

It is acceptable that the vehicular receiving element is configured to receive the multicast tagged with information of an area of a predefined shape having a boundary defined by latitude and longitude or a link identifier for identifying a link as the information of the designated area.

According to the vehicular communication system of the mentioned configuration, the information related to an area of a predefined shape served as the designated area or a link identified by a link identifier can be collected in real time from an appropriate vehicle as the probe information.

It is acceptable that the communication controlling element is configured to transmit the probe information to the vehicular transmitting element on condition that the present position of the vehicle at the present time is in the designated area and a past position thereof in the past designated time was in the designated area as well.

According to the vehicular communication system of the mentioned configuration, the probe information can be collected in real time from not only a vehicle whose present position is in the designated area at the present time but also a vehicle whose past position was present in the designated area in the past in consideration of the high capability that it holds useful information in estimating the present state thereof in the designated area.

It is acceptable that the communication controlling element is configured to store the multicast in a storing element on condition that a present position of the vehicle, a past position of the vehicle given by a travel log or a future position of the vehicle given by a travel schedule is in the designated area.

According to the vehicular communication system of the mentioned configuration, since a multicast will not be stored in a storing element of a vehicle if the vehicle is irrelevant to the designated area included in the multicast in consideration of the present position thereof or the like, therefore, the storage capacity of the storing element can be utilized efficiently.

To accomplish an object described above, there is provided in the present invention a vehicular information collecting system composed of the vehicular communication system and the server, wherein the server is provided with a multicast generating element configured to generate the multicast; a server transmitting element configured to transmit the multicast to the vehicle served as a subject; a server receiving element configured to receive the probe information transmitted from the vehicle; and an analyzing element configured to analyze the probe information received by the server receiving element.

According to the vehicular information collecting system of the present invention, the probe information is sent to the server from a vehicle out of an arbitrary number of vehicles whose present position is located in the designated area whose information is included in a multicast received by the vehicle. According thereto, the information related to the designated area can be collected in real time from an appropriate vehicle as the probe information by the server. Thereby, a movement cost, weather or temperature, an outbreak spot of an accident or a black spot where attention is needed to be paid on driving for the designated area and the like can be estimated on the basis of analysis on the probe information.

It is acceptable that the multicast generating element is configured to generate the multicast tagged with a vehicular identifier for identifying each of the vehicles; the communication controlling element is configured to transmit the probe information to the vehicular transmitting element further on condition that the vehicular identifier inherent in the vehicle is matched with the vehicular identifier tagged in the multicast; and the multicast generating element is configured to adjust a part of the vehicular identifiers so as to adjust the number of the vehicles served as the subject for collecting the probe information.

According to the vehicular information collecting system of the mentioned configuration, the number of the vehicles served as the subject for collecting the probe information can be adjusted through adjusting a part of the vehicular identifiers contained in the multicast. Thus, for example, when the collected probe information is insufficient, the probe information can be collected sufficiently by increasing the range of the subject for collecting the probe information, namely, the number of vehicles. On the other hand, however, when the probe information has been collected excessively, by decreasing the number of vehicles served as the subject for collecting the probe information, the probe information can be collected appropriately.

It is acceptable that the multicast generating element is configured to adjust the size or shape of the designated area so as to adjust the number of the vehicles served as the subject for collecting the probe information.

According to the vehicular information collecting system of the mentioned configuration, the number of the vehicles served as the subject for collecting the probe information as a result of adjusting the size or the shape of the designated area contained in the multicast. For example, when the collected probe information is insufficient, the range of the subject vehicles for collecting the probe information is increased through generating and broadcasting a new multicast containing a designated area broader than the prior one, and as a result thereof, the probe information can be collected sufficiently. On the other hand, however, when the probe information has been collected excessively, the range of the subject vehicles for collecting the probe information is decreased through generating and broadcasting a new multicast containing a designated area narrower than the prior one, and as a result thereof, the probe information can be collected appropriately.

It is acceptable that the server receiving element is configured to receive a request for the probe information of the designated area from a first vehicle; the multicast generating element is configured to generate the multicast for collecting the probe information according to the request received by the server receiving element; and the server transmitting element is configured to transmit the multicast to a second vehicle served as the vehicle mounted with the vehicular communication system, and to transmit the probe information received from the second vehicle by the server receiving element or an analysis result obtained by the analyzing element on the basis of the probe information to the first vehicle.

According to the vehicular information collecting system of the mentioned configuration, the probe information related to the designated area, which is needed by the first vehicle, can be collected from the second vehicle appropriately in real time. The probe information collected from the second vehicle or the analysis result based on the collected probe information can be provided to the first vehicle in real time.

To accomplish an object described above, there is provided in the present invention a vehicular communication program which is configured to make a vehicular computer provided with a wireless communication device function as the vehicular communication system aforementioned.

According to the vehicular communication program of the present invention, the vehicular computer can be functioned as the system which makes the server to collect the information related to a designated area from an appropriate vehicle in real time as the probe information.

BRIEF DESCRIPTION OF THE DRAWINGS

FIGS. 4(*a*) to 4(*c*) are schematic diagrams illustrating data formats for multicast, respectively.

DETAILED DESCRIPTION OF THE PREFERRED EMBODIMENTS

Hereinafter, an embodiment of a vehicular information collecting system and the like according to the present invention will be described with reference to the drawings.

Figure 1:
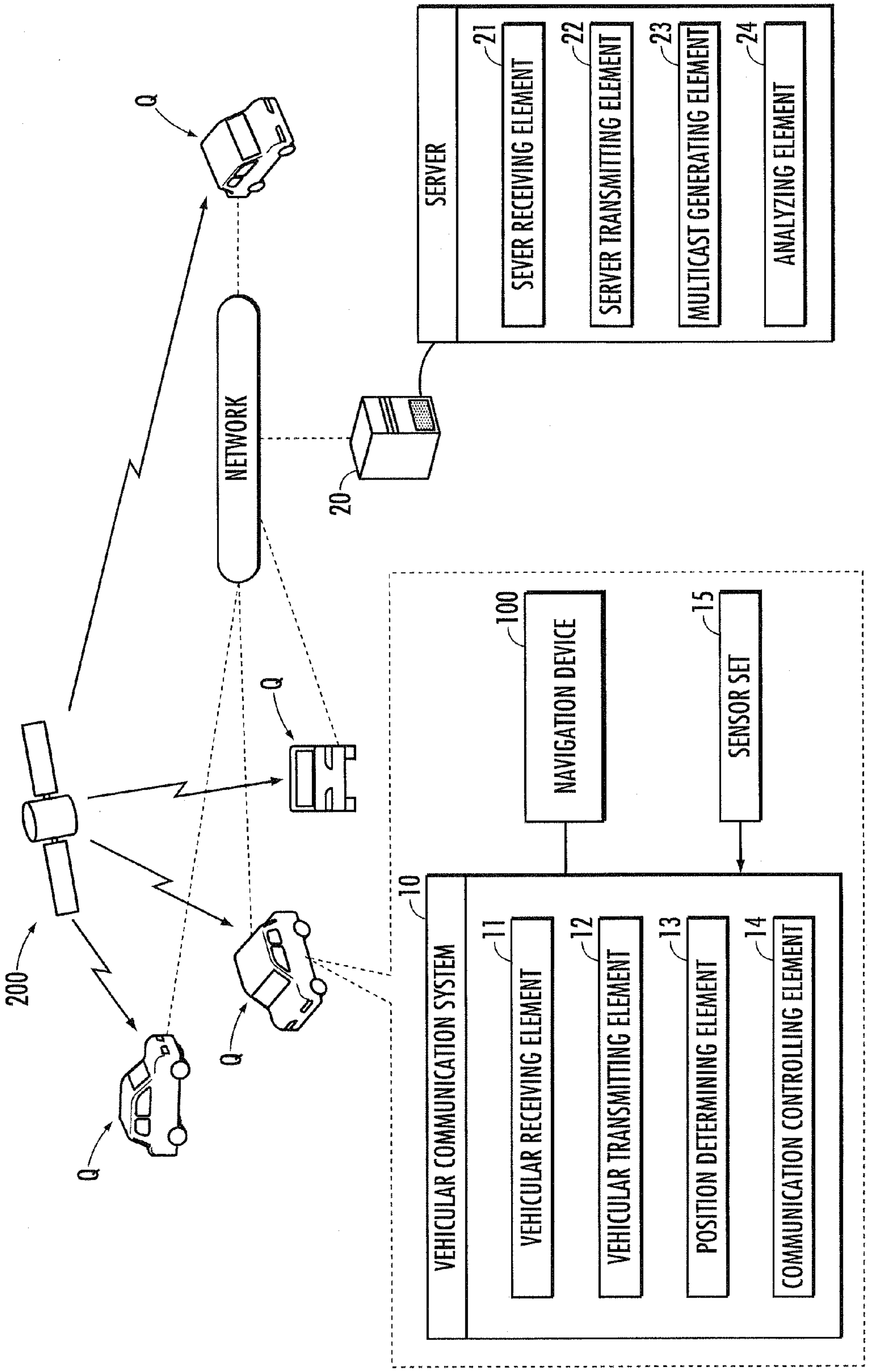
FIG. 1 is a schematic diagram illustrating a vehicular information collecting system of the present invention.

As illustrated in FIG. 1, the vehicular information collecting system is composed of a vehicular communication system 10 and a server 20. The vehicular communication system 10 is mounted in each of plural vehicles (four-wheeled automobiles) Q.

The vehicular communication system 10 is composed of an ECU (Electronic Control Unit provided with a CPU, a ROM, a RAM, an I/O circuit, an A/D circuit and buses or the like joining the mentioned components). The ECU may be a vehicular computer mounted in the vehicle Q. A vehicular communication program is stored in a memory or a storing device included in the ECU as software. The vehicular communication program is retrieved and executed by the CPU appropriately so as to make the vehicular communication system 10 perform its functions.

The vehicular communication system 10 is provided with a vehicular receiving element 11, a vehicular transmitting element 12, a position determining element 13, and a communication controlling element 14.

The vehicular receiving element 11 is configured to receive a multicast tagged with information of a designated area, which is broadcast from the server 20 through the intermediary of a satellite 200.

The vehicular transmitting element 12 is configured to transmit a probe information in the form of packet data to the server 20 through the intermediary of a network.

The position determining element 13 is composed of a GPS receiver and if necessary a sensor, such as an acceleration sensor or the like, for determining a posture or travel state of the vehicle Q. The position determining element 13 is configured to determine sequentially positions of the vehicle Q on the basis of GPS signals received from a GPS satellite (it may be the same as or different from the satellite 200) by the GPS receiver and if necessary output signals from the sensor. The positions of the vehicle Q determined by the position determining element 13 are stored sequentially in the storing device with the determination time thereof.

The communication controlling element 14 is configured to collect information denoting a state of the vehicle Q as the probe information from output signals from a sensor set 15 mounted in the vehicle Q, and to transmit the probe information to the vehicular transmitting element 12 on condition that the present position of the vehicle Q determined by the position determining element 13 is located in a designated area contained in the multicast.

In addition to the vehicular communication system 10, the vehicle Q is also mounted with a navigation apparatus 100. The navigation apparatus 100 is composed of an ECU (it may be the same as or different from the ECU included in the vehicular communication system 10), and is provided with an interface configured to allow a user to input or the like a desired position and a departure position, and a display configured to show a navigation route leading the vehicle Q from the present position or the departure position to the desired position on a map.

The server 20 is composed of a computer (composed of a CPU, a ROM, a RAM, an I/O circuit and the like) capable of communicating with every vehicular communication system 10 via the network. The server 20 is provided with a server receiving element 21, a server transmitting element 22, a multicast generating element 23, and an analyzing element 24.

The server receiving element 21 is configured to receive a request for the probe information from the vehicle Q served as a first vehicle via the network, and to receive the probe information from the vehicle Q served as a second vehicle via the network.

The server transmitting element 22 is configured to broadcast or transmit the multicast to an unspecific subject, namely a plurality of vehicles Q, via the satellite 200.

The multicast generating element 23 is configured to generate the multicast tagged with information of the designated area.

The analyzing element 24 is configured to analyze the probe information received by the server receiving element 21.

Hereinafter, descriptions will be carried out on functions of the vehicular information collecting system with the aforementioned configuration. According to different situations, the vehicle Q may have the role of the first vehicle Q1 as well as the second vehicle Q2 where appropriate.

Figure 2:
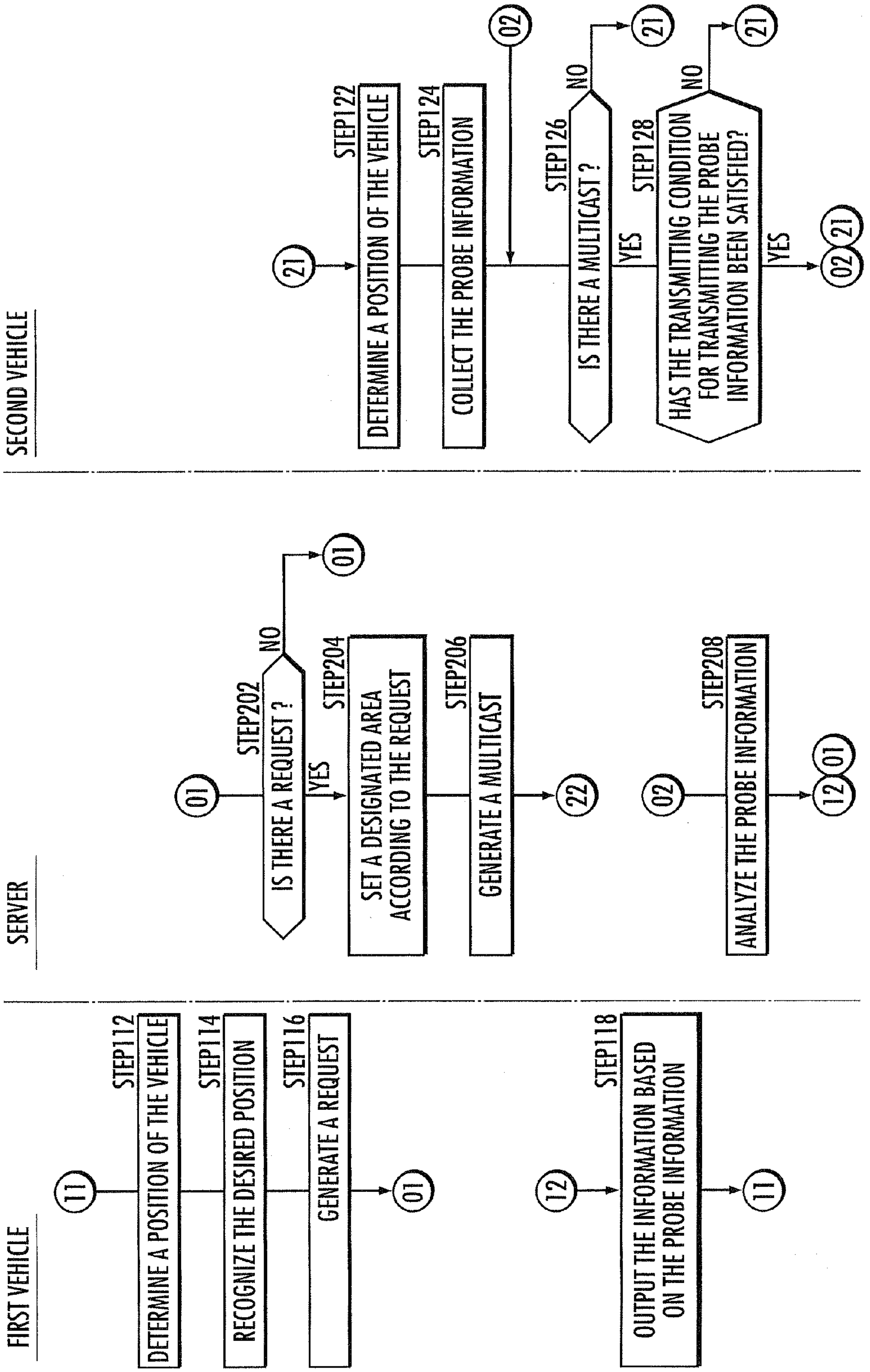
FIG. 2 is a flow chart illustrating functions of the vehicular information collecting system.

For the first vehicle Q1, the present position P1 of the first vehicle Q1 is sequentially determined by the position determining element 13 (FIG. 2/STEP 112).

The present position P1 of the first vehicle Q1 and the desired position P2 input to the navigation apparatus 100 by the user are recognized by the communication controlling element 14 (FIG. 2/STEP 114 (refer to FIG. 3)). As a substitute for the present position P1 of the first vehicle Q1, a departure position thereof input to the navigation apparatus 100 by the user may also be recognized.

Thereafter, a request for the probe information is generated by the communication controlling element 14 on the basis of either one or both of the present position P1 and the desired position P2 (FIG. 2/STEP 116).

For example, the communication controlling element 14 generates a request containing either one or both of the present position P1 and the desired position P2, a navigation route r joining the present position P1 and the desired position P2 searched by the navigation apparatus 100 on the basis of a navigation map stored in the storing device, or a link identifier for identifying a link Li (i=1, 2, . . . n) constituting the navigation route r. The generated request is transmitted from the first vehicle Q1 to the server 20 by the vehicular transmitting element 12 (refer to the arrowed solid line 1 in FIG. 5).

In the server 20, whether or not the request has been received by the server receiving element 21 is determined (FIG. 2/STEP 202). If it is determined that the request is present (FIG. 2/STEP 202 . . . YES), a designated area is set by the multicast generating element 23 according to the request (FIG. 2/STEP 204).

Figure 3:
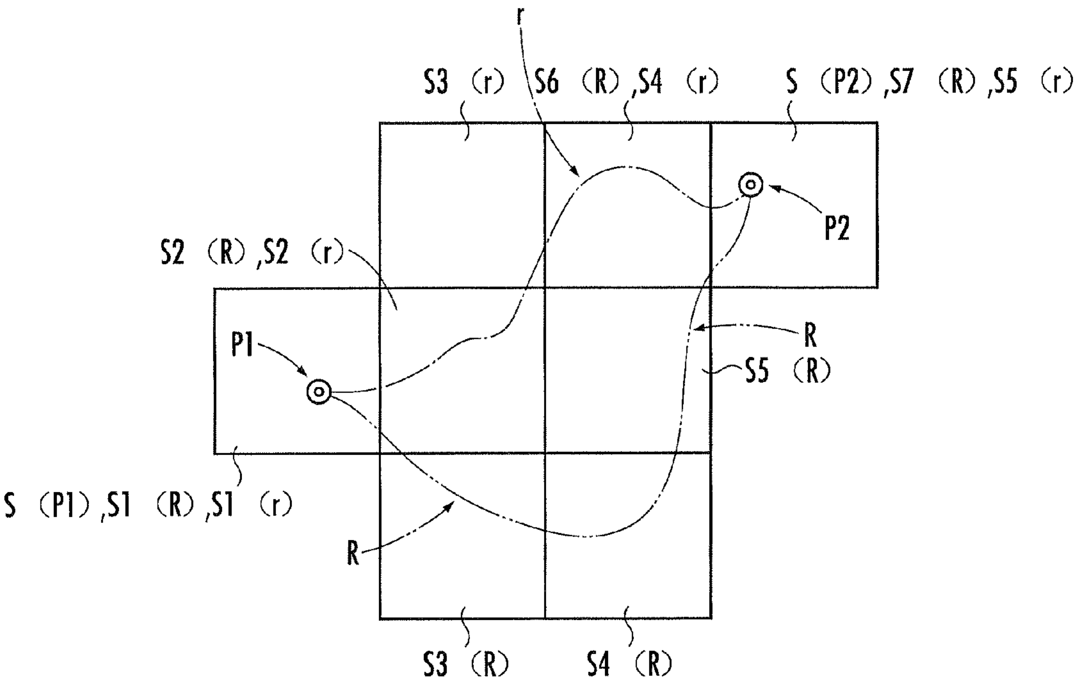
FIG. 3(*a*) and FIG. 3(*b*) are explanatory diagrams illustrating conditions of satisfaction for transmitting probe information, respectively.
Figure 3:
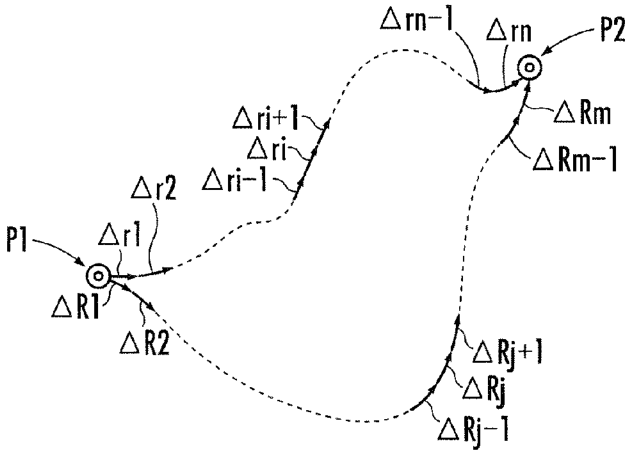

As illustrated in FIG. 3(*a*), when the present position P1 of the first vehicle Q1 is included in the request, a rectangular area S (P1) containing or centered at the present position P1, or a link contained therein can be set as a designated area. As illustrated in FIG. 3(*a*), when the desired position P2 of the first vehicle Q1 is included in the request, a rectangular area S (P2) containing or centered at the desired position P2, or a link contained therein can be set as a designated area.

In addition to the rectangular area, an area having an arbitrary shape, such as a triangular shape, a circular shape, an elliptical shape or the like, may be set as the designated area. As illustrated in FIG. 3(*a*), when the present position P1 and the desired position P2 of the first vehicle Q1 are included in the request, a support route R joining the present position P1 and the desired position P2 is searched; apart of or the entire part of the areas S1(R) to S7(R) containing a part of the support route R or the links contained in a part of or the entire part of the areas S1(R) to S7(R) can be set by the server 20 as the designated area. The support route R may be searched on the basis of the up-to-date map information stored in a map data base, the up-to-date road traffic information stored in a road traffic information data base, the up-to-date weather information stored in a weather information data base and the like.

As illustrated in FIG. 3(*a*), when the navigation route r searched by the navigation apparatus 100 mounted in the first vehicle Q1 is included in the request, a part of or the entire part of the areas S1(*r*) to S5(*r*) containing a part of the navigation route r or links contained in a part of or the entire part of the areas S1(*r*) to S5(*r*) can be set as the designated area.

Further, as illustrated in FIG. 3(*b*), when apart of or the entire part of a link Δri (i=1 to n) constituting the navigation route r is included in the request, the link Δri, an area containing the link Δri, or a link contained in the area can be set as the designated area. Furthermore, as illustrated in FIG. 3(*b*), a part of or the entire part of a link ΔRj (j=1 to m) constituting the support route R, an area containing the link ΔRj, or a link contained in the area can be set as the designated area.

Subsequently, the multicast is generated by the multicast generating element 23 (FIG. 2/STEP 206).

Specifically, as illustrated in FIG. 4(*a*), a multicast of a data format including respectively fields for the type of transmitting condition, the designated area (with the latitude and the longitude denoting the bottom left corner and the top right corner of the rectangular area, respectively), the transmitting end time (X minutes after the present time or the transmitting initial time) and the transmitting frequency (Y times per minute or per meter) is generated.

Moreover, as illustrated in FIG. 4(*b*), a multicast of a data format including respectively fields for the type of transmitting condition, the designated area (designated number of links or link ID (identifier)), the transmitting end time and the transmitting frequency is generated.

Furthermore, as illustrated in FIG. 4(*c*), a multicast of a data format including respectively fields for the type of transmitting condition, the designated area (with the latitude and the longitude denoting the bottom left corner and the top right corner of the rectangular area, respectively), VIN (the nth digit of VIN is "6", for example), the transmitting end time and the transmitting frequency is generated. The generated multicast is broadcast to an arbitrary second vehicle Q2 from the server transmitting element 22 through the intermediary of the satellite 200 (refer to FIG. 5/dotted arrow line 2).

For the second vehicle Q2, the present position of the second vehicle Q2 is sequentially determined by the position determining element 13 (FIG. 2/STEP 122).

Then, the information denoting the state of the second vehicle Q2, which is obtained from the output signals of the sensor set 15, is collected as the probe information by the communication controlling element 14 (FIG. 2/STEP 124).

Specifically, the information denoting a part of or the entire part of a link where the second vehicle Q2 traveled and a movement cost thereof, an activity log of an environment accommodation device (a wiper, an air conditioner or the like) operated in compliance with an ambient weather or temperature of the second vehicle Q2, and an activity log of a steering device or a braking device mounted in the second vehicle Q2 (a location where the wheel is rapidly turned or a location where the brake is paddled hard) is collected or recognized as the probe information.

Thereafter, whether or not the multicast has been received by the vehicular receiving element 11 is determined (FIG. 2/STEP 126). If it is determined that the multicast is present (FIG. 2/STEP 126 . . . YES), whether or not the transmitting condition for transmitting the probe information has been satisfied is determined by the communication controlling element 14 (FIG. 2/STEP 128).

Figure 5:
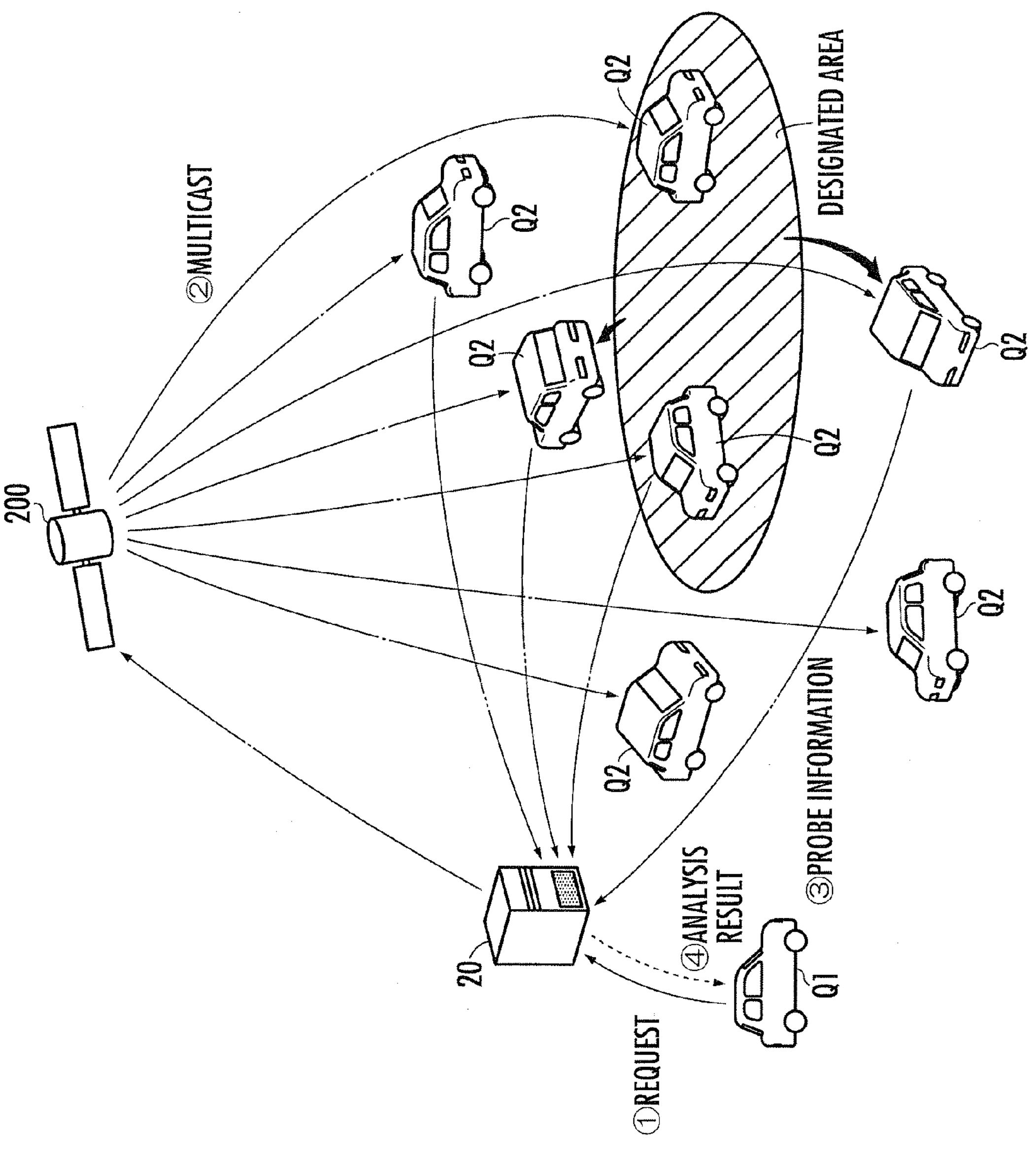
FIG. 5 is a schematic diagram illustrating functions of the vehicular information collecting system.

Specifically, the present position P1 of the second vehicle Q2 or a past position thereof before a designated duration is included in the designated area (the rectangular area of a boundary defined by the latitude and the longitude in the multicast illustrated in FIG. 4(*a*) and FIG. 4(*c*), or the link identified by the link ID in the multicast illustrated in FIG. 4(*b*)) is used as the transmitting condition. Thereby, as illustrated in FIG. 5, at the time where the multicast is broadcast, in addition to a second vehicle Q2 whose present position is in the designated area (the shaded portion), another second vehicle Q2 which has been out of the designated area in a way illustrated by the bold arrow line also satisfies the transmitting condition as the past position thereof before a designated duration was in the designated area.

In the multicast illustrated in FIG. 4(*c*), it is used as a further transmitting condition when a designated digit number of the VIN of the second vehicle Q2 is a specific symbol such as "6". When it is determined that the transmitting condition has been satisfied (FIG. 2/STEP 128 . . . YES), the probe information is sent from the second vehicle Q2 to the server 20 at a designated frequency, in detail, every designated cycle or every designated distance traveled by the vehicle Q2 (refer to FIG. 5/the dotted and dashed arrow line 3).

The collected probe information is analyzed by the analyzing element 24 in the server 20 (FIG. 2/STEP 208).

Specifically, a link cost (predicted travel time or the like) for each link included in the designated area is calculated on the basis of each link where the second vehicle Q2 traveled and the movement cost thereof included in the probe information. In the calculation of the link cost, a predicted travel time for the first vehicle Q1 to reach a link from the present position P1 thereof which maybe calculated according to the distance for the vehicle Q1 to travel from the present position P1 to the link, or a predicted timing at which the first vehicle Q1 reaches the link may be used.

On the basis of the activity log of the environment accommodation device (a wiper, an air conditioner or the like) of the second vehicle Q2 which is included in the probe information, whether it is raining or snowing in the designated area, what the atmospheric temperature is or whether the road is frozen or not in the designated can be estimated. On the basis of the activity log of the steering device or the braking device mounted in the second vehicle Q2 which is included in the probe information, the location where the wheel is rapidly turned or the location where the brake is paddled hard, and consequently a black spot where attention is needed to be paid on driving can be estimated. Note that it is acceptable to search an appropriate support route R from the viewpoint of moving the first vehicle Q1 smoothly to the desired position P2 by using the analysis result of the link cost or the like. The probe information or the analysis result performed by the analyzing element 24 on the basis of the probe information is transmitted by the server transmitting element 22 from the server 20 to the first vehicle Q1 (refer to FIG. 5/the dashed arrow line 4).

Thereafter, a piece of information based on the probe information is output by the navigation apparatus 100 in the first vehicle Q1 (FIG. 2/STEP 118).

Specifically, on the basis of the link cost or the like contained in the probe information, the navigation route r joining the present position P1 and the desired position P2 is searched and displayed on the display by the navigation apparatus 100. Further, a mark or an icon denoting the analysis result of the probe information, namely the weather conditions such as whether it is raining or snowing or what the atmospheric temperature is, can be placed on a map in accordance with the designated area and the map can be shown on the display.

Furthermore, a mark or an icon denoting the analysis result of the probe information, such as a black spot where attention is needed to be paid on driving or an outbreak spot of an accident can be placed on the map in accordance with the designated area and the map can be shown on the display. Moreover, the support route R searched by the server 20, or the navigation route r calculated or searched by the server 20 so as to contain a component link of the support route R can be shown on the display.

According to the vehicular communication system 10 with the aforementioned functions, the probe information can be sent to the server 20 from a second vehicle Q2 out of an arbitrary number of the second vehicles Q2, whose present position is located in the designated area whose information is included in a multicast received by the second vehicles Q2, namely, the present position thereof is in a designated area with high necessity to move smoothly the first vehicle Q1 to the desired position P2 or the like (refer to FIG. 5/the arrow line 3).

Further, the probe information can be collected in real time from a second vehicle Q2 whose past position was in the designated area even though the present position thereof is beyond the designated area in consideration of the high capability that the second vehicle Q2 holds useful information in estimating the present state thereof in the designated area (refer to FIG. 5/the arrow line 3).

According thereto, the information related to the designated area can be collected as the probe information in real time from an appropriate vehicle Q at an appropriate frequency denoted by the designated cycle or distance. Then, according to the analysis on the probe information, the movement cost, the weather or the temperature, the outbreak spot of accident or the black spot where attention should be paid on driving, or the like of the designated area can be estimated and provided to the user of the first vehicle Q1 via the navigation apparatus 100. Moreover, the probe information is collected by the server 20 only from the second vehicles Q2 with the designated VIN (vehicle identifier), thus, the communicated information amount can be controlled appropriately from the viewpoint of saving communication cost, regulating communication traffic or the like.

It is acceptable for the communication controlling element 14 to store the multicast in the storing device on condition that the present position P1, the past position given by the travel log or the future position given by the travel schedule of the vehicle is included in the designated area. Since a multicast will not be stored in the storing device of the vehicle if the vehicle is irrelevant to the designated area included in the multicast in consideration of the present position thereof or the like, therefore, the storage capacity of the storing device can be utilized efficiently.

In the aforementioned embodiment, the designated area is set according to a request from the first vehicle Q1 (refer to FIG. 2/STEP 204). However, as another embodiment, it is acceptable for the multicast generating element 23 to search a location where an event is being held from a data base and set an area including the location where the event is being held as the designated area. Then, a multicast containing the designated area is generated and is broadcast to an arbitrary number of vehicles Q at an appropriate time, such as before, in, or after the duration where the event is held. Accordingly, among plural vehicles Q received with the multicast, the probe information can be collected from a vehicle Q close to the event location by the server 20.

It is acceptable to configure the multicast generating element 23 to adjust a part of VIN (vehicular identifier) so as to adjust the number of vehicles Q served as the subject for collecting the probe information. According thereto, the number of vehicles Q served as the subject for collecting the probe information can be adjusted via adjusting apart of VIN contained in the multicast.

For example, when the collected probe information is insufficient at the time when the multicast containing a VIN whose last digit is "6" (refer to FIG. 4(*c*)) is broadcast, the range of the subject for collecting the probe information can be increased by generating and broadcasting another new multicast containing a VIN whose last digit is "3", and consequently, the probe information can be collected sufficiently.

On the other hand, however, when the probe information has been collected excessively at the time when the multicast containing the VIN whose last digit is "6" (refer to FIG. 4(*c*)) is broadcast, the range of the subject for collecting the probe information can be decreased by generating and broadcasting a fresh multicast containing the VIN whose digit prior to the last one is limited to "4", "8" or "9", and consequently, the probe information can be collected appropriately.

It is acceptable that the multicast generating element 23 is configured to adjust the size or shape of the designated area so as to adjust the number of the vehicles Q served as the subject for collecting the probe information. According to the mentioned configuration, the size or the shape of the designated area contained in the multicast can be adjusted, and consequently, the number of vehicles Q served as the subject for collecting the probe information can be adjusted.

For example, when the collected probe information is insufficient, the range of the subject vehicles for collecting the probe information is increased through generating and broadcasting a new multicast containing a designated area broader than the prior one, and as a result thereof, the probe information can be collected sufficiently.

On the other hand, however, when the probe information has been collected excessively, the range of the subject vehicles for collecting the probe information is decreased through generating and broadcasting a new multicast containing a designated area narrower than the prior one, and as a result thereof, the probe information can be collected appropriately.

What is claimed is:

1. A vehicular information collecting system composed of a vehicular communication system mounted in a vehicle and a server, the vehicular communication system, comprising:

a vehicular receiving element configured to receive a multicast tagged with information of a designated area;

a communication controlling element configured to collect information denoting a state of the vehicle as a probe information from an output signal of a sensor mounted in the vehicle;

a vehicular transmitting element configured to transmit the probe information collected by the communication controlling element to a server; and a position determining element configured to determine a position of the vehicle, the server comprising:

a multicast generating element configured to generate the multicast;

a server transmitting element configured to transmit the multicast to the vehicle served as a subject;

a server receiving element configured to receive the probe information transmitted from the vehicle; and an analyzing element configured to analyze the probe information received by the server receiving element, wherein the multicast generating element is configured to generate the multicast tagged with content of a designated part, which is a part of a vehicular identifier for identifying each of the vehicles, and the communication controlling element is configured to transmit the probe information to the vehicular transmitting element on condition that a present position of the vehicle determined by the position determining element is located in the designated area included in the multicast and that content of a designated part which is a part of the vehicular identifier inherent in the vehicle is matched with content of the designated part included in the multicast; and the multicast generating element is configured to adjust content of the designated part of the vehicular identifiers so as to adjust the number of vehicles served as the subject for collecting the probe information.

2. The vehicular communication system according to claim 1, wherein the communication controlling element is configured to collect information denoting a part of or the entire part of a link where the vehicle traveled and a movement cost thereof, an activity log of an environment accommodation device operated in compliance with an ambient weather or temperature of the vehicle, and an activity log of a steering device or a braking device mounted in the vehicle as the probe information.

3. The vehicular communication system according to claim 1, wherein the vehicular receiving element is configured to receive the multicast tagged with information of a designated cycle or a designated distance; and the communication controlling element is configured to transmit the probe information to the vehicular transmitting element every designated cycle or every designated distance traveled by the vehicle.

4. The vehicular communication system according to claim 1, wherein the vehicular receiving element is configured to receive the multicast tagged with information of an area of a predefined shape having a boundary defined by latitude and longitude or a link identifier for identifying a link as the information of the designated area.

5. The vehicular communication system according to claim 1, wherein the communication controlling element is configured to transmit the probe information to the vehicular transmitting element on condition that the present position of the vehicle at the present time is in the designated area and a past position thereof in the past designated time was in the designated area as well.

6. The vehicular communication system according to claim 1, wherein the communication controlling element is configured to store the multicast in a storing element on condition that a present position of the vehicle, a past position of the vehicle given by a travel log or a future of the vehicle position given by a travel schedule is in the designated area.

7. The vehicular information collecting system according to claim 1, wherein the multicast generating element is configured to adjust the size or shape of the designated area so as to adjust the number of the vehicles served as the subject for collecting the probe information.

8. The vehicular information collecting system according to claim 1, wherein the server receiving element is configured to receive a request for the probe information of the designated area from a first vehicle;

the multicast generating element is configured to generate the multicast for collecting the probe information according to the request received by the server receiving element; and the server transmitting element is configured to transmit the multicast to a second vehicle served as the vehicle mounted with the vehicular communication system, and to transmit the probe information received from the second vehicle by the server receiving element or a analysis result obtained on the basis of the probe information by the analyzing element to the first vehicle.

9. A vehicular communication program configured to make a vehicular computer provided with a wireless communication device function as the vehicular communication system of claim 1.

* * * * *